July 20, 1965 K. DINTER ETAL 3,196,365
BROAD BAND VIDEO AMPLIFIER
Filed April 26, 1961
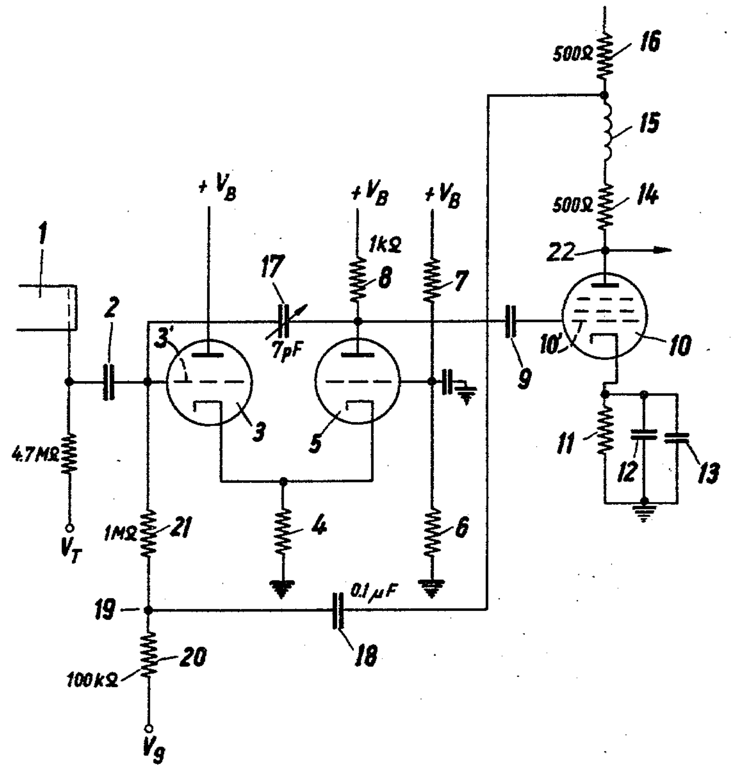
INVENTORS
Konrad Dinter &
Adolf Reindl
BY George H. Spencer
ATTORNEY United States Patent Office 3,196,365 Patented July 20, 1965

3,196,365

BROAD BAND VIDEO AMPLIFIER

Konrad Dinter and Adolf Reindl, both of Konstanz, Germany, assignors to Telefunken Aktiengesellschaft, Berlin, Germany Filed Apr. 26, 1961, Ser. No. 105,746
Claims priority, application Germany, Apr. 29, 1960, T 18,298
3 Claims. (Cl. 330—100)

The present invention relates generally to a broad band amplifier, and, more particularly, to a video amplifier, for the preamplification of video signals fed by a television camera.

Television camera tubes, especially those of the so-called photoconductivity type (Vidicon, Resistron etc.), usually have relatively large output capacitance which, together with the large internal resistance of the signal electrode, reduces the band width or the upper frequency limit of their output signals to about 180 kilocycles per second instead of the 5 megacycles desirable as a minimum.

It is known to design the input stage of the video amplifier as a cascade circuit with several triodes connected in parallel (see, for example, RCA publication "6198 Vidicon" 6198–9–57), and to connect a series inductance into the line feeding the control grid of the first triode in order to avoid the above-mentioned drawback. This, however, results in the circuit having a tendency to oscillate easily especially if the camera tube is displaceable for purposes of distance adjustment.

It is further known (see "Waveforms," p. 767) to increase the band width of the video amplifier by a combined positive and negative feedback to the control grid of the first triode. In this known circuit, however, the amplifier design, comprising several consecutive anode amplifiers, results in a plurality of time constant circuits which likewise effect an oscillation.

The object of this invention, therefore, is to improve the band width and other electrical characteristics of the circuit, such as the noise-to-signal ratio, to free the circuit of oscillation, and to eliminate the Miller effect.

Accordingly, the invention comprises a broad band amplifier containing two amplifier elements, especially triodes provided with a common cathode resistance. The anode of the second amplifier element, which contains an anode resistance, feeds a portion of the signal back via a condenser for the feedback of the high frequency of the band to the control grid. This anode is fed with the input signals of the first amplifier element which is connected as a cathode follower; the anode is also connected with the control grid of a further amplifier element, especially a multi-grid tube. From the anode resistance of this tube, a portion of the low frequencies of the band are fed to the control grid of the first amplifier element as a negative feedback.

Additional objects and advantages of the present invention will become apparent upon consideration of the following description when taken in conjunction with the accompanying drawings in which the single figure is a circuit diagram of the present invention, the same showing exemplatory numerical values for the resistors and capacitors.

Referring now to the drawing, the video signal from the signal electrode of a television camera tube 1, for example a Vidicon, is fed via a condenser 2 to the control grid 3' of a triode 3 connected as a cathode follower. The cathode resistor 4 of the triode 3, is, with the anode, directly across the operating voltage, and forms a cathode resistance of triode 5 whose control grid is at a fixed voltage due to the voltage divider formed by the arrangement of resistors 6 and 7. The anode of the triode 5 is connected via a resistor 8 of one thousand ohms with the operating voltage, and, via a condenser 9, with the control grid 10' of a multi-grid tube 10, such as a pentode. The cathode of the pentode 10 is grounded through a resistor 11, which is in parallel with a relatively large capacitance in the form of two condensers 12 and 13 connected so that the full tube amplification may be utilized. The anode of the pentode 10 is connected with the operating voltage through the series connection of a 500 ohm resistor 14, an inductor 15, and a further resistor 16 of 500 ohms. The output signals are conducted from the anode of the pentode 10 at point 22 and fed to a following stage, not shown in the drawing.

The circuit described so far has the advantage that the first triode, because of its small amplification ($<1$), (1) does not require any neutralization, (2) results in an extremely favorable noise-to-signal ratio, and (3) has no Miller effect, due to the fact that the anode is directly connected with the operating voltage, there being no signal voltage at the anode. As is known, the Miller effect has the disadvantage of increasing the effective input capacitance of the triode, thereby impairing the band width.

In order to correct the effect of the output capacitance of the camera tube 1, which is disadvantageous for the band width of the system, a condenser 17, preferably adjustable and having a capacitance of about 7 picofarads (1 picofarad equals $1\times10^{-6}$ microfarads), is connected between the anode of the triode 5 and the control grid of the triode 3 for the positive feedback of the higher frequencies, and there is a negative feedback of the low frequencies of the range to the control grid of the triode 3 via a 0.1 microfarad condenser 18. The condenser 18 is preferably connected to a point 19, two resistances 20 and 21 of 100,000 ohms and 1 megohm, respectively, through which a fixed grid bias is fed to the control grid of the triode 3.

In a circuit according to the drawing, which has proved satisfactory in practice, optimum operational properties are achieved if the total amplification between the input of the triode 3 and the output of the triode 5 has a value of between 2 and 4.

The present invention is not limited to the use of tubes but may be operated in the same way with transistors.

It will be understood that the above description of the present invention is susceptible to various modifications, changes, and adaptations, and the same are intended to be comprehended within the meaning and range of equivalents of the appended claims.

What is claimed is:

1. A broad band amplifier, comprising, in combination: a pair of amplifier elements, the anode of the first element being directly connectable with the operating voltage; a common cathode resistor connected to the cathodes of said elements; a feedback condenser connected between the anode of the second element and the control grid of the first element for the feedback of high frequency components of the signal at the anode of said second element in a positive sense; a further amplifier element connected to at least one of said amplifier elements, an anode resistor connected to the anode of the further amplifier element and to the control grid of the first amplifier element for feedback of low frequency components of a signal at the anode of the further element in a negative sense; and inductor means connected to said anode resistor and to the control grid of the first amplifier element to limit the feedback to low frequencies.

2. A broad band amplifier, comprising, in combination: a pair of amplifier elements; a common cathode resistor connected to the cathodes of said elements; a feedback condenser connected between the anode of the second element and the control grid of the first element for the feedback of high frequency components of a signal at the anode of said second element in a positive sense; and a further amplifier element, connected to at least one of said pair of amplifier elements, a first anode resistor and low pass filter means connected in series between said anode of the further amplifier element and the control grid of the first amplifier element for providing a path for negative feedback of low frequency components of a signal from the anode of the further element to the grid of the first element.

3. The amplifier as defined in claim 2 comprising a second anode resistor connected to a source of operating voltage and said filter means including an inductor connected between first and second anode resistors and a feedback line connected between the tapping point of the second anode resistor and the inductor on the one hand and to the grid of the first amplifier element on the other hand.

References Cited by the Examiner

UNITED STATES PATENTS

| | | | |
|---|---|---|---|
| 2,245,598 | 6/41 | Llewellyn | 330—104 X |
| 2,652,458 | 9/53 | Miller | 330—75 X |
| 2,752,433 | 6/56 | White et al. | 330—75 X |
| 2,798,905 | 7/57 | Graham | 330—104 X |

FOREIGN PATENTS

| | | |
|---|---|---|
| 117,262 | 2/56 | Russia. |

OTHER REFERENCES

Happel, G. E. and Hesselberth, W. M., Engineering Electronics. McGraw-Hill, New York, 1953, pages 303–307.

ROY LAKE, *Primary Examiner.*

BENNETT G. MILLER, *Examiner.*